United States Patent

Crain

[11] Patent Number: 5,878,994
[45] Date of Patent: Mar. 9, 1999

[54] GATE VALVE

[75] Inventor: Darrell C. Crain, Sweeny, Tex.

[73] Assignee: Phillips Petroleum Company, Bartlesville, Okla.

[21] Appl. No.: 566,461

[22] Filed: Dec. 1, 1995

[51] Int. Cl.$^6$ .................................................. F16K 3/00
[52] U.S. Cl. .......................................................... 251/329
[58] Field of Search .................................. 251/329, 326; 137/15

[56] References Cited

U.S. PATENT DOCUMENTS

| | | | |
|---|---|---|---|
| 1,293,874 | 2/1919 | Murray | 251/329 |
| 3,356,334 | 12/1967 | Scaramucci | 251/329 |
| 3,556,472 | 1/1971 | Grove | 251/329 |
| 3,749,114 | 7/1973 | Johnstone | 251/329 |
| 3,778,030 | 12/1973 | Carlin | 251/329 |
| 4,054,978 | 10/1977 | Freeman et al. | 29/157.1 |
| 4,344,354 | 8/1982 | Chan | 137/315 |
| 4,347,865 | 9/1982 | Worley | 137/375 |
| 4,610,430 | 9/1986 | Besnard | 251/326 |
| 4,709,901 | 12/1987 | Pierson | 251/329 |

Primary Examiner—Denise L. Ferensic
Assistant Examiner—Ramyar Farid
Attorney, Agent, or Firm—Ryan N. Cross

[57] ABSTRACT

A gate valve having a bolted bonnet is modified by welding a first ring to the valve bonnet and a second identical ring to the valve housing with weld beads on the inner edge of the rings. After mating the bonnet and the housing, a final weld is made joining the outer edges of the two rings.

2 Claims, 3 Drawing Sheets

GATE VALVE

BACKGROUND OF THE INVENTION

The present invention relates to valves used to control the flow of fluids under pressure and, particularly, to modifying valves in order to make them suitable for use with fluids under higher pressures than the unmodified valve was suitable for use.

Valve bonnets may be bolted onto the valve body structure or valve housing. Often times such bonnet-housing connections rely upon only a gasket placed between the housing and bonnet to maintain a fluid-tight seal. This is especially true for gate valves where the pressure rating of the valve is generally limited by the integrity of the seal made between the valve bonnet and the valve housing. Thus, for example, the seal between the valve bonnet and housing may leak fluid at a pressure above 600 psi even though structurally the valve is suitable for use with fluids at pressures as great as 1000 psi.

It would, therefore, be desirable to have a method of mounting the valve bonnet on the valve housing which would result in a seal that would allow the valve to be used at higher pressures than when the valve is bolted onto the valve body using a gasket to maintain a seal.

SUMMARY OF THE INVENTION

It is, therefore, an object of the present invention to provide a seal between the valve bonnet and valve housing which can withstand higher pressures than seals that are created by utilizing a gasket between the bonnet and the housing.

The above object is realized in a method of rebuilding a valve structure having a housing with a first flange surface and a bonnet with a second flange surface, wherein the bonnet is connected to the housing so that the first flange surface contacts the second flange surface, so that the pressure under which the valve structure can operate is increased, comprising: removing the bonnet from the housing; placing a first ring, having a first side and a second side adjacent to the first flange surface such that the first side is juxtaposed in contact with the first flange surface to thus form a first interior joint; welding the first ring to the first flange surface at the first interior joint; placing a second ring, having a first side and a second side adjacent to the second flange surface such that the first side is juxtaposed in contact with the second flange to thus form a second interior joint; welding the second ring to the second flange surface at the second interior joint; mating the bonnet with the housing such that the second side of the first ring is juxtaposed to the second side of the second ring to thus form an exterior joint; and welding the first ring to the second ring at the exterior joint.

According to another aspect of the invention, there is provided a gate valve of the type which includes housing means having a hollow interior, opposing coaxial tubular members each having an inner end and an outer end. The inner end of each tubular member terminates within the hollow interior of the housing means with the inner ends spaced apart from each other, an opening formed by a first flange having an axis perpendicular to the coaxes of the tubular members; gate means; and a bonnet having an opening terminating in a second flange and having a hollow interior adapted to receive the gate means, wherein the first flange is coupled to the second flange so that the bonnet is connected to the housing and a portion of the gate means is situated internally of the housing means in a plane normal to the coaxes and has a closed position engaging the ends of the tubular members providing a fluid-tight seal and preventing flow of fluid through the tubular members and an open position situated beyond the coaxes of the tubular members for enabling flow of fluid therethrough wherein the improvement comprises: a first ring having a first side contacting the first flange to form an interior joint and welded to the first flange, and a second side; a second ring having a first side contacting said second flange to form an interior joint and welded to the second flange, and a second side wherein the second side of the first ring and the second side of the second ring are juxtaposed in contact with each other and form an exterior joint and are welded together.

DETAILED DESCRIPTION OF THE INVENTION

Figure 1:
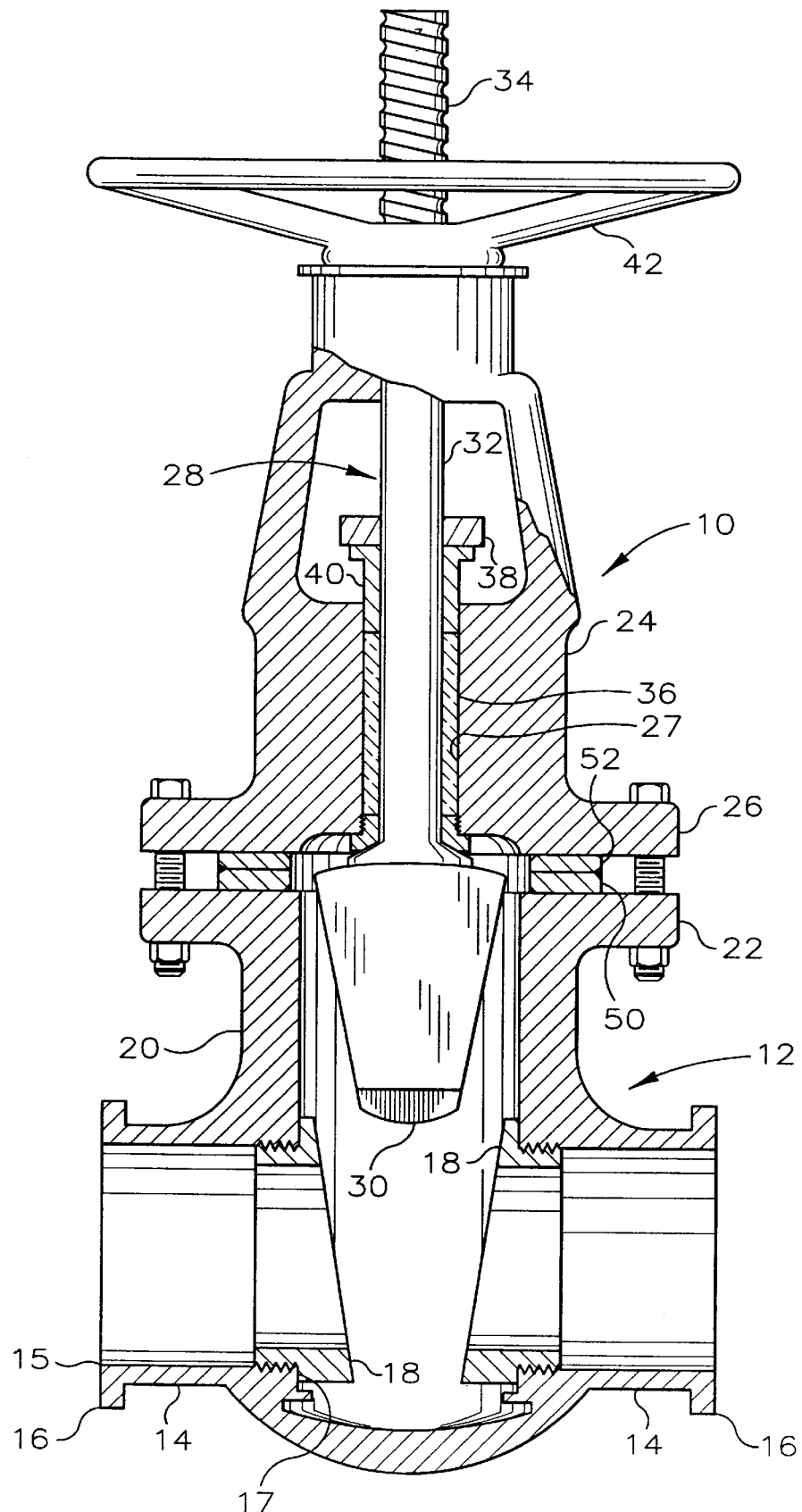
FIG. 1 is an illustration of a valve according to the invention, the valve being shown with most of the housing broken away and with parts of the structure situated therein shown in section.
Figure 2:
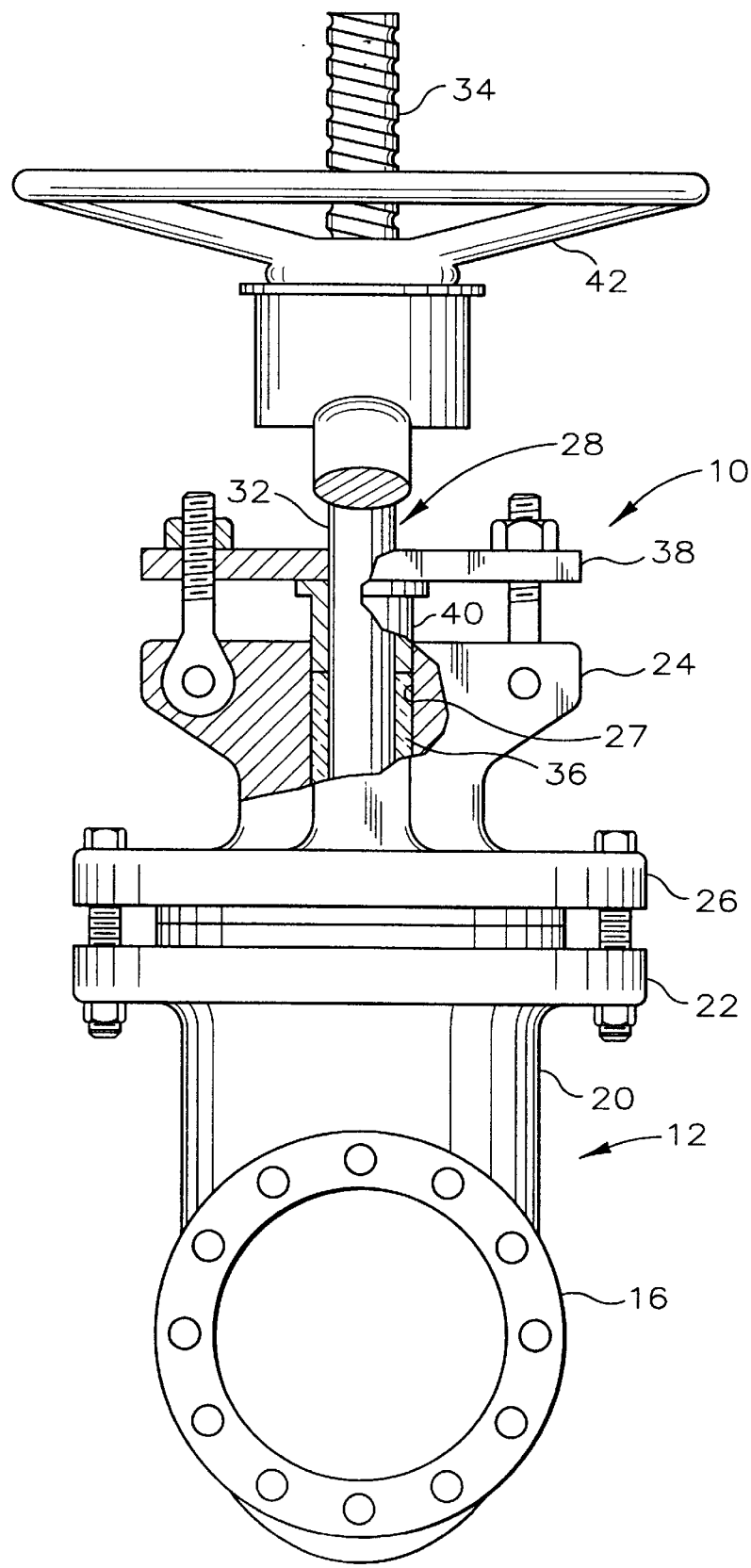
FIG. 2 is an elevation of the valve of FIG. 1 as seen from the right of FIG. 1. The valve is shown with part of the housing broken away and with part of the structure situated therein shown in section.

Referring to FIGS. 1 and 2, the illustrated gate valve 10 of the present invention includes a housing means 12 which is of a hollow T-shaped configuration. This housing means 12 is made up of components which are, preferably, wrought, in that the metal thereof can be rolled or forged, so that the housing means 12 is not made of cast metal. This housing means 12 has a pair of opposed coaxial tubular members 14 terminating at their exterior end 15 in circular flanges 16 which serve to connect the valve to suitable pipes so as to provide for the flow of fluid therethrough. Although the flanges 16 are shown as being integral with the remainder of the housing means 12, these flanges 16 can be separate components which are welded to the remainder of the housing means 12. Additionally, if desired, the flanges can be omitted and the interior of tubular members 14 threaded near their end 15 so that a suitable pipe can be connected by means of matching threads. The tubular members 14 terminate at their interior ends 17 in coaxial sleeves 18. It will be seen that in the illustrated example the tubular members 14 are internally threaded while the sleeves 18 are externally threaded and are simply threaded into the tubular members 14.

The central upright portion 20 of the housing means 12 terminates also in a flange 22 which can be an integral part of the housing means or welded thereto and which serves to connect an upper bonnet 24 to the central upright portion 20. The upper bonnet 24 terminates in a lower flange 26 which is mounted on flange 22 for completing the valve structure. The connection of bonnet 24 to upright portion 20 can be better seen in FIG. 3. Flange 22 and flange 26 each have a ring, 50 and 52 respectively, attached on first side 54 and 56 to the flanges by welding at the interior joint formed by the flange and the ring, joints 58 and 60 respectively. Joints 58 and 60 should be welded so as to form a fluid-tight seal. The rings have second sides 62 and 64 which are preferably machined milled to provide flat mating surfaces. The rings 50 and 52 are positioned such that when bonnet 24 is mounted on upright portion 20, second sides 62 and 64 are mated. Exterior joint 66 formed by sides 62 and 64 is welded in order to provided a fluidtight seal. The rings 50 and 52 should be made of metal, preferably steel, and are preferably flat thin rings used in joints to prevent leaks. To provide additional structural support, flange 22 and flange 26 can be bolted together.

Returning now to FIGS. 1 and 2, bonnet 24 has a passage 27 which is adapted to receive a gate means 28. Gate means 28 has a wedge-shaped head portion 30 and shaft 32 which is threaded at end 34. Gate means 28 is disposed within bonnet 24 so that shaft 32 extends through bonnet 24 with its longitudinal axis perpendicular to the coaxes of tubular members 14 and the head portion 30 extending into the hollow interior of housing means 12 when the bonnet 24 is mounted on the central upright portion 20. The portion of shaft 32 within bonnet 24 is surrounded by packing 36 which serves to make a fluid-tight seal between passage 27 and shaft 32. As can be best seen in FIG. 2, packing 36 is held in place by means of truss 38 and ring 40. Ring 40 rests on packing 36 and extends at least partially into passage 27. Truss 38 is in contact with ring 40 and can be bolted to bonnet 24 so as to apply pressure on ring 40 and, hence, packing 36.

Shaft 32 has its end 34 operationally connected to a moving means 42 which, as illustrated in FIGS. 1 and 2, can be turned to open and close gate means 28 by operationally engaging the threads of end 34 so as to move shaft 32. Although not shown in detail, the construction of moving means 42, as well as equivalent structures, will be readily apparent to one skilled in the art.

When gate means 28 is in its closed position, wedge shaped head portion 30 engages sleeves 18 providing a fluid-tight seal and preventing flow of fluid through the tubular members. When gate means 28 is in its open position, wedge shaped head portion 30 is situated beyond the coaxes of tubular means 14 for enabling flow of fluid therethrough.

The optimum use of the invention is in the reconstruction of an existing gate valve to enable it to handle higher fluid pressures. To reconstruct an existing gate valve, flange 22 is unbolted from flange 26 and the bonnet 24 is removed from the housing means 12. A first ring 50 is placed with its first side 54 adjacent to the surface of flange 22 such that first side 54 is juxtaposed in contact with the surface of flange 22 to thus form an interior joint 58. Flange 22 and ring 50 are welded together at the interior joint 58. Ring 52 is placed adjacent to the surface of flange 26 such that first side 56 is juxtaposed to the surface of flange 26 to thus form an interior joint 60. Ring 52 is welded to flange 26 at the interior joint. The bonnet and housing are mated such that second side 62 is juxtaposed in contact with second side 64 to thus form an exterior joint 66. First ring 50 is welded to second ring 52 at exterior joint 66. Flange 22 is bolted to flange 26. Optionally, the second sides 62 and 64 of the rings 50 and 52 can be machine milled to have flat mating surfaces to produce a tighter seal.

Figure 3:
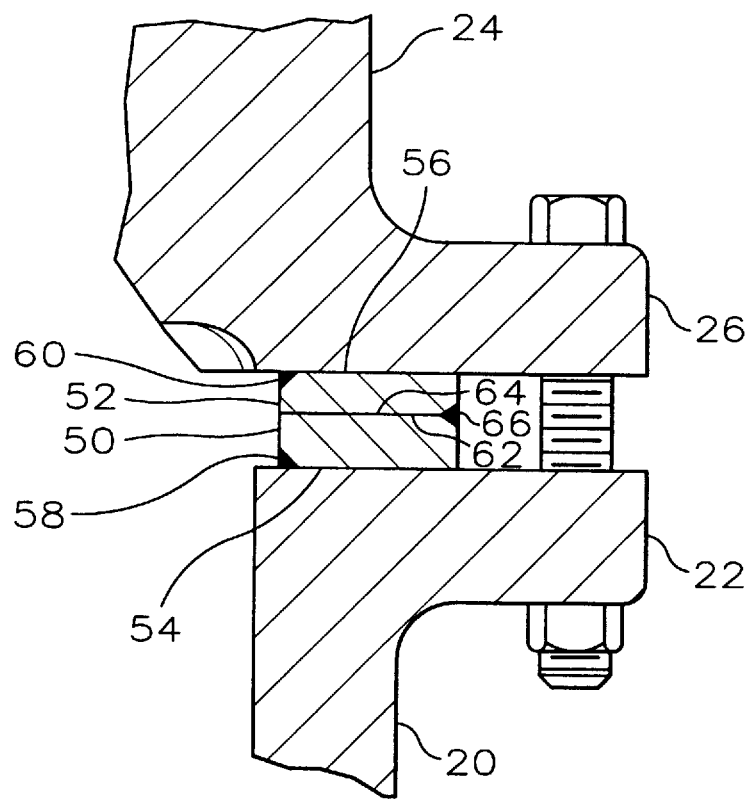
FIG. 3 is an enlarged fragmentary sectional illustration of the seal formed by the seal rings at the connection between the bonnet and housing.

While the valve structure has been illustrated in the embodiment of FIGS. 1–3 as a gate valve structure, it is to be understood that the invention is applicable to other types of valves employing a bonnet type structure. Many modifications and variations of the present invention are possible in light of the above teachings. It is, therefore, to be understood that within the scope of the appended claims the invention may be practiced otherwise than as specifically described.

That which is claimed:

1. A gate valve of the type which includes a one piece housing means having an integral first flange having planer surface, a first hollow interior, opposing coaxial tubular members positioned within said housing each having an inner end which terminates within said first hollow interior, and an outer end with said inner ends spaced apart from each other, and an opening formed by the first flange having an axis perpendicular to the coaxes of said tubular members; gate means; and a one piece bonnet having an integral second flange having a planer surface, said bonnet having an opening formed by said second flange and having a second hollow interior adapted to receive said gate means, wherein said first flange is coupled to said second flange by bolts so that said bonnet is connected to and spaced from said housing and said gate means is partially situated internally of said housing means in a plane normal to the coaxes and has a closed position engaging said ends of said tubular members providing a fluid-tight seal and preventing flow of fluid through said tubular members and an open position situated beyond said coaxes of said tubular members for enabling flow of fluid therethrough wherein the improvement comprises:

a first metal ring forming an aperture and having a first planer side contacting said planer surface of said first flange to form an interior joint and welded to said first flange such that said aperture aligns with said opening formed by said first flange, and a second planer side;

a second metal ring forming an aperture and having a first planer side contacting said planer surface of said second flange to form an interior joint and welded to said second flange such that said aperture aligns with said opening formed by said second flange, and a second planer side wherein said second planer side of said first metal ring and said second planer side of said second metal ring are machine milled to form mating surfaces and wherein said second planer side of said first metal ring and said second planer side of said second metal ring are juxtaposed in contact with each other and form an exterior joint and are welded together wherein the first and second rings are located radially inward of said bolts and are in fluid communication with said first and second hollow interiors.

2. A gate valve according to claim 1 wherein said first metal ring is welded to said first flange at their interior joint to form a fluid-tight seal, said second metal ring is welded to said second flange at their interior joint to form a fluid-tight seal and said first metal ring is welded to said second metal ring at their exterior joint to form a fluid-tight seal.

* * * * *